United States Patent
Duncan et al.

(10) Patent No.: US 11,249,319 B2
(45) Date of Patent: Feb. 15, 2022

(54) REDUCED FOOTPRINT COLLIMATOR DEVICE TO FOCUS LIGHT BEAM OVER LENGTH OF OPTICAL PATH

(71) Applicant: MACCAL Company, Inc., San Jose, CA (US)

(72) Inventors: Robert Duncan, San Jose, CA (US); Michael Hall, Santa Cruz, CA (US); James Nguyen, San Jose, CA (US)

(73) Assignee: Mac Cal Inc.

( * ) Notice: Subject to any disclaimer, the term of this patent is extended or adjusted under 35 U.S.C. 154(b) by 0 days.

(21) Appl. No.: 15/146,120

(22) Filed: May 4, 2016

(65) Prior Publication Data

US 2018/0196278 A1    Jul. 12, 2018

(51) Int. Cl.
*G02B 27/30* (2006.01)
*G02B 1/11* (2015.01)
*G01N 15/14* (2006.01)

(52) U.S. Cl.
CPC .............. *G02B 27/30* (2013.01); *G02B 1/11* (2013.01); *G01N 15/1434* (2013.01); *G01N 15/1459* (2013.01)

(58) Field of Classification Search
CPC ...... G02B 27/30; G02B 1/11; G02B 27/0966; G02B 6/2937; G02B 27/283; G02B 21/002; G02B 6/352; G02B 6/3604; G02B 6/3582; G02B 6/425; G02B 6/2931; G02B 6/4206; G01N 15/1434; G01N 15/1459; G01N 15/1436; G01N 21/01; G01J 3/024; G01J 3/453; B23K 9/0956
USPC ......................................................... 359/641
See application file for complete search history.

(56) References Cited

U.S. PATENT DOCUMENTS

| | | | | |
|---|---|---|---|---|
| 4,088,396 A * | 5/1978 | Edelstein | ............... | G02B 7/023 359/822 |
| 4,332,706 A * | 6/1982 | Uehara | ................... | C03C 17/32 523/450 |
| 5,872,627 A * | 2/1999 | Miers | ................. | G01N 15/1431 356/338 |
| 7,375,362 B2 * | 5/2008 | Treves | ................... | G01N 21/55 250/559.4 |

(Continued)

FOREIGN PATENT DOCUMENTS

JP        2001009580 A  *  1/2001

*Primary Examiner* — Stephone B Allen
*Assistant Examiner* — Rahman Abdur
(74) *Attorney, Agent, or Firm* — Bachmann Law Group PC

(57) ABSTRACT

A reduced footprint collimator device to focus light beam over length of optical path for use in an optical cytometry device or other optical instrument where a focused beam of light is passed through a test medium and then sampled by a photomultiplier or multiple photomultipliers for analysis. This device provides alignment and focus of that beam and collimation along the entire beam path. In addition in order to reduce the overall footprint of the beam path this device uses a precision coated prism to redirect the optical path perpendicular to the entering optical beam. The reduced footprint collimator device to focus light beam over length of optical path generally includes a reduced footprint 90 degree collimator which allows light beam collimation, beam path alignment, selectable beam focal distance, and reduces stray light reflections all in a minimal footprint.an These features allows for a smaller overall instrument design.

4 Claims, 4 Drawing Sheets

(56) References Cited

U.S. PATENT DOCUMENTS

| | | | | |
|---|---|---|---|---|
| 7,709,821 B2* | 5/2010 | Casstevens | ............... | G01J 3/02 |
| | | | | 250/458.1 |
| 8,189,187 B2* | 5/2012 | Graham | ................. | C03B 23/04 |
| | | | | 356/246 |
| 2013/0258469 A1* | 10/2013 | Park | .................... | G02B 27/283 |
| | | | | 359/485.01 |

* cited by examiner

REDUCED FOOTPRINT COLLIMATOR DEVICE TO FOCUS LIGHT BEAM OVER LENGTH OF OPTICAL PATH

RELATED APPLICATIONS

The present application is a continuation application of U.S. provisional patent application Ser. No. 62/179,578, filed May 2, 2016, for REDUCED FOOTPRINT COLLIMATOR DEVICE TO FOCUS LIGHT BEAM OVER LENGTH OF OPTICAL PATH, by Robert Duncan, Michael Hall, James Nguyen, included by reference herein and for which benefit of the priority date is hereby claimed.

FIELD OF THE INVENTION

Background of the Invention

For flow cytometry applications, laser beams of various wavelengths of light are directed through a chamber filled with the sample to be tested. The samples absorb some wavelengths while passing others. The laser beams which are not absorbed pass out of the chamber and typically are directed into a fiber optic cable for connection to a device which directs the beams through various filters into photo receptors (photomultipliers) which convert the light signals into electrical signals for computer analysis. The problem is that the farther the photomultiplier is from the laser source the lower the beam power is at the receptor. To optimize the signal at the receptor it is desired to minimize the length of the laser beam path. In addition there is a desire to reduce the overall size of cytometry instrumentation. As cytometry is seen more in field applications, portability is important.

Typically an optical fiber connects axially to the photomultiplier subsystem since the fiber and its output needs to be in the same plane as the photoreceptors.

SUMMARY

A fiber cable typically has a minimum bend radius of approximately six inches. This required bend radius forces a much larger footprint which makes the overall instrument larger or limits the number of receptors.

An objective is to provide a Reduced Footprint Collimator Device To Focus Light Beam Over Length Of Optical Path that maintains the beam power while redirecting the beam along a path perpendicular to the incoming beam. The fiber cable now enters perpendicular to the photoreceptor subsystem This gives more room for the minimum fiber bend radius and allows a reduction in the overall footprint of the beam path.

Another objective is to provide a Reduced Footprint Collimator Device To Focus Light Beam Over Length Of Optical Path that allows simple alignment of the optical beam with the receiving photomultipliers.

Another objective is to provide a Reduced Footprint Collimator Device To Focus Light Beam Over Length Of Optical Path that focus the light beam into a collimated beam which maintains a given beam diameter over the total length of the beam to each receptor.

Another objective is to provide a Reduced Footprint Collimator Device To Focus Light Beam Over Length Of Optical Path that limits spurious internal reflection by using anti-reflective coatings on all internal surfaces.

Other objectives and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

The invention generally relates to an optical beam collimator which includes a reduced footprint 90 degree collimator which allows light beam collimation, beam path alignment, selectable beam focal distance, and reduces stray light reflections all in a minimal footprint. This feature allows for a smaller overall instrument design.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

The objective is to provide a reduced footprint collimator device to focus light beam over length of optical path for use in an optical cytometry device or other optical instrument where a focused beam of light is passed through a test medium and then sampled by a photomultiplier or multiple photomultipliers for analysis. This device provides alignment and focus of that beam and collimation along the entire beam path.

Another objective is to provide a Reduced Footprint Collimator Device To Focus Light Beam Over Length Of Optical Path that maintains the beam power while redirecting the beam along a path perpendicular to the incoming beam. This allows a reduction in the overall footprint of the beam path.

Another object is to provide a Reduced Footprint Collimator Device To Focus Light Beam Over Length Of Optical Path that allows simple alignment of the optical beam with the receiving photomultipliers.

Another object is to provide a Reduced Footprint Collimator Device To Focus Light Beam Over Length Of Optical Path that focus the light beam into a collimated beam which maintains a given beam diameter overt the total length of the beam to each receiver.

Another object is to provide a Reduced Footprint Collimator Device To Focus Light Beam Over Length Of Optical Path that limits spurious internal reflection by using anti-reflective coatings on all internal surfaces.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
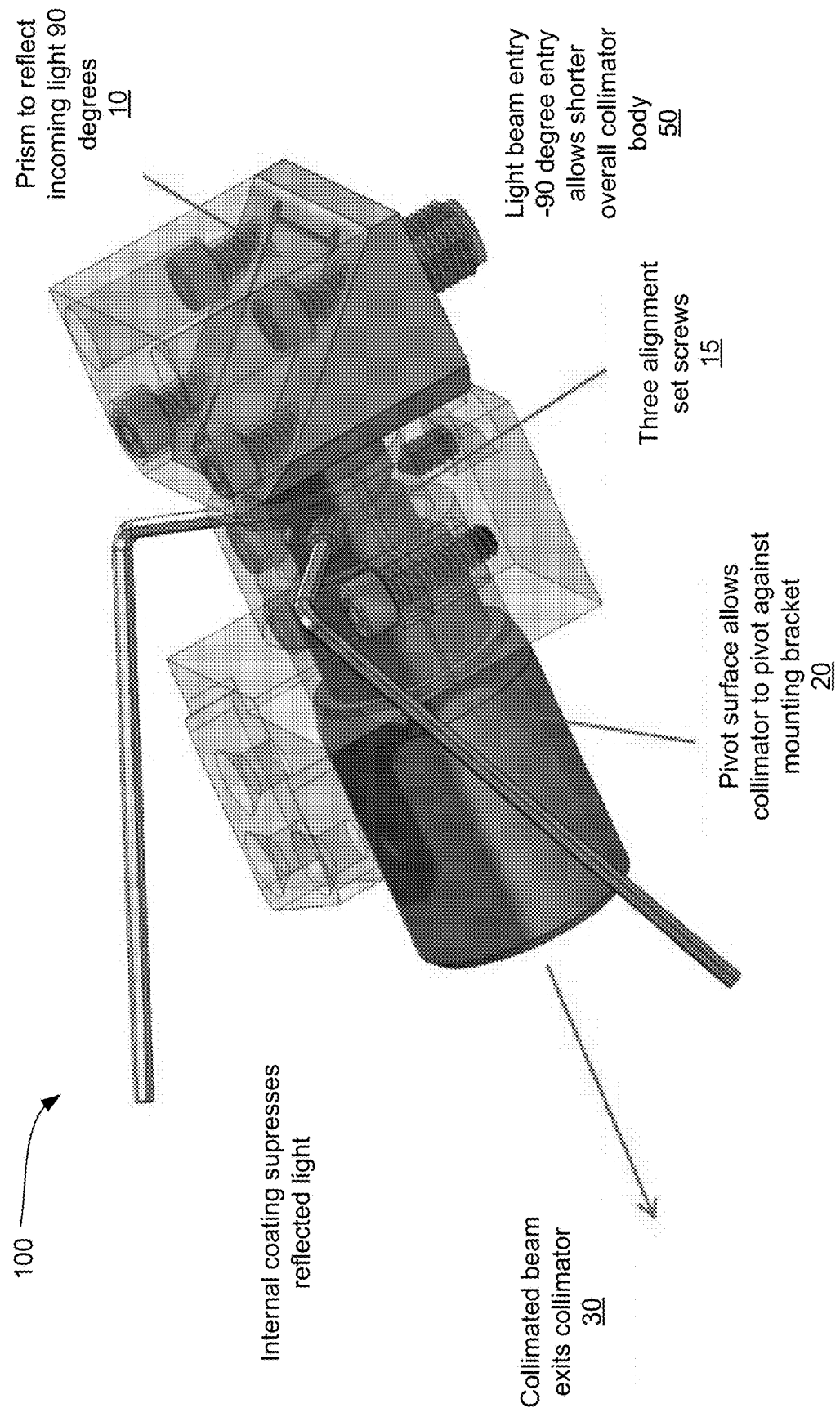
FIG. 1 is a right perspective view of a complete collimator assembly showing mounting and adjustment capability and redirection of the incoming laser beam perpendicular to the incoming path.

FIG. 1, depicting an collimator assembly 100, includes a prism 10 to reflect incoming light 90 degrees, three alignment set screws 15, a fillet surface 20 which allows a collimator to pivot against a mounting bracket, a collimated beam 30 that exits the collimator, and a light beam entry 50 having a −90 degree entry that allows for a shorter overall collimator body.

Figure 2:
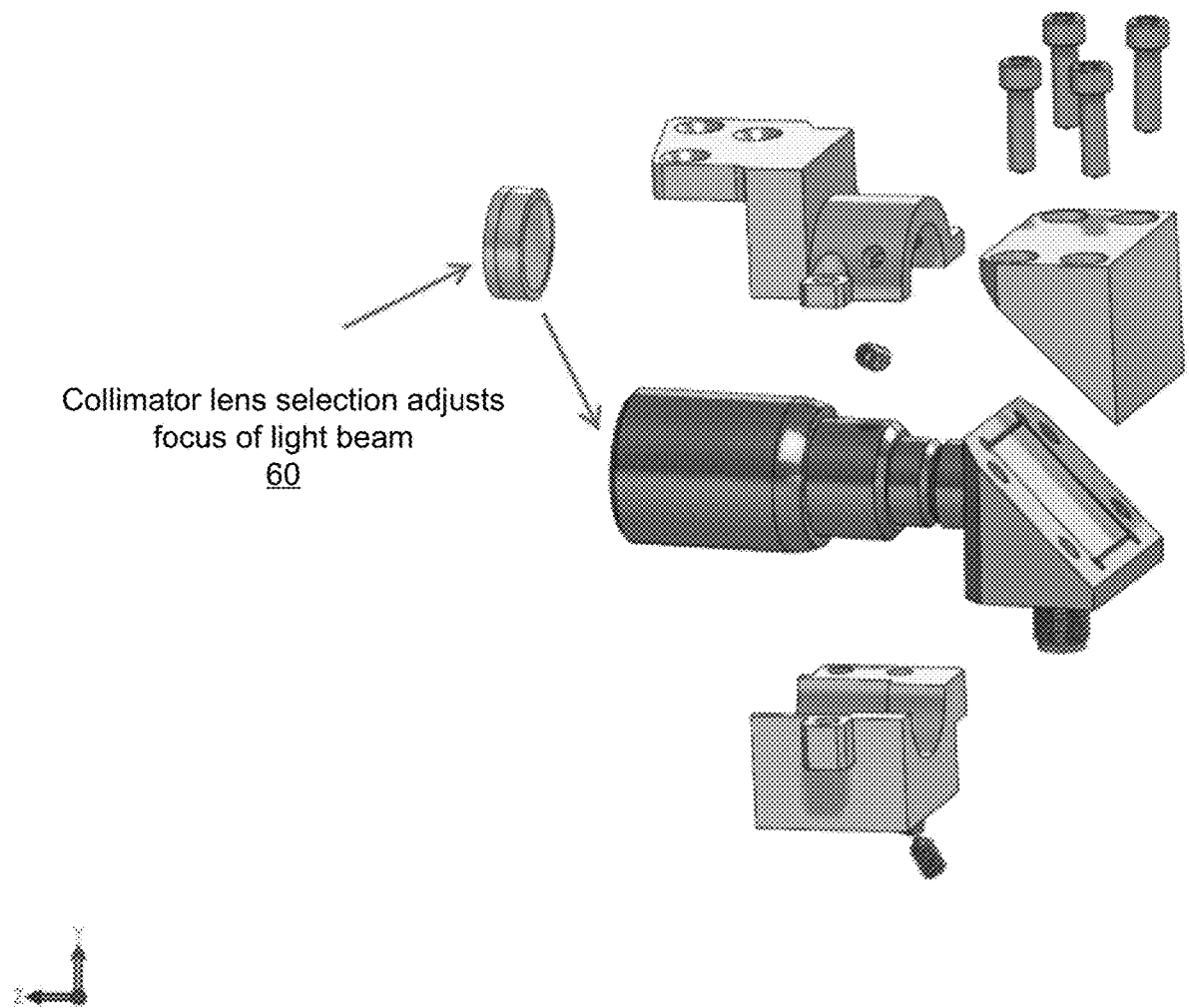
FIG. 2 is a right exploded view of a collimator assembly showing assembly of the various components of the collimator.

FIG. 2 is a right exploded view of a collimator assembly showing assembly of the various components of the collimator. FIG. 2 includes a collimator lens selection 60 that adjusts the focus of a light beam.

Figure 3:
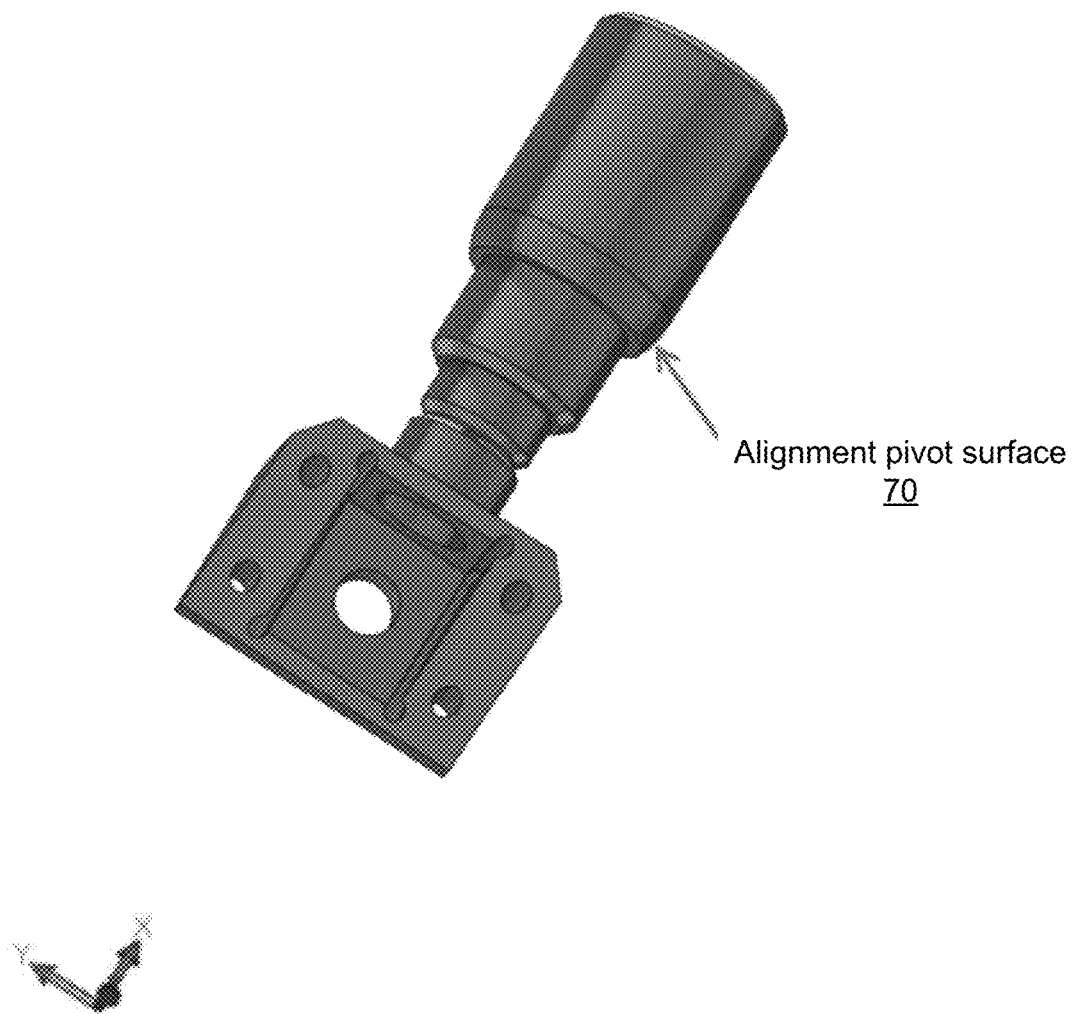
FIG. 3 is a top partial view of a collimator gimbal surface used for adjustment and mounting of the prism/mirror.

FIG. 3 is a top partial view of a collimator gimbal surface used for adjustment and mounting of the prism/mirror. The gimbal surface includes an alignment pivot surface 70.

Figure 4:
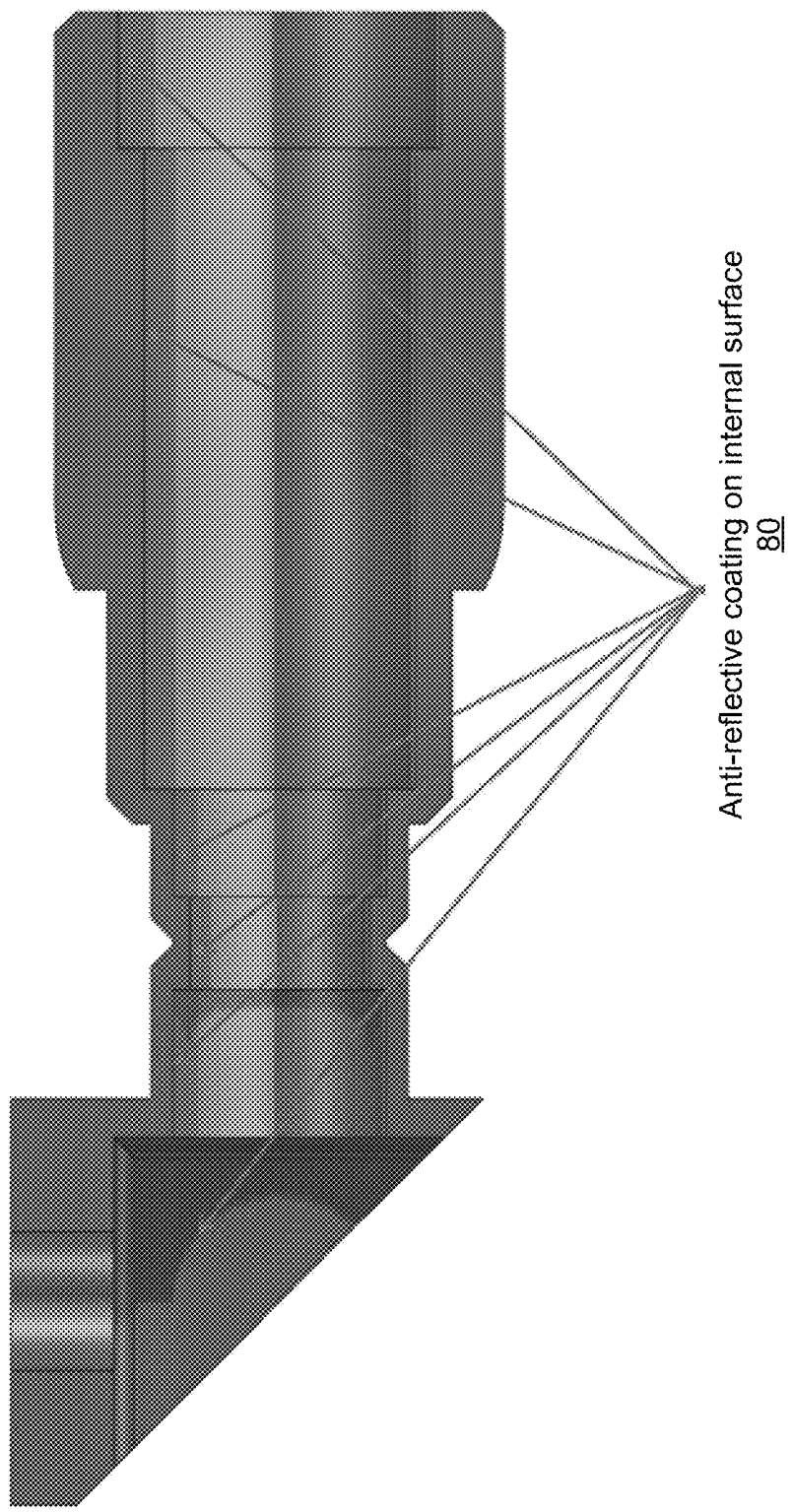
FIG. 4 is a left section view of a collimator showing surfaces treated with anti-reflective coating.

FIG. 4 is a left section view of a collimator showing surfaces treated with anti-reflective coating. The collimator of FIG. includes an anti-reflective coating 80 on internal surfaces.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A collimator device, comprising:
    a photoreceptor system that receives an entering light beam;
    a light focusing element that focuses the entering light beam over a length of an optical path;
    a collimator lens selection within the collimator device and along the optical path, the collimator lens selection able to adjust the focus of the light beam into a collimated beam which maintains a given beam diameter over a total length of the beam;
    a pivot surface to allow aiming of the light beam using a spring-loaded set_screw against a bottom of the device and a plurality of other set_screws located at 120 degrees around a diameter of the device;
    and wherein a coated prism redirects the optical path to a direction perpendicular to the entering light beam and through a collimator exit, the coating on the prism suppressing reflected light, wherein a fiber cable accepts the entering light beam perpendicular to the beam path,
    the fiber cable entering perpendicular to the photoreceptor system,
    the collimator outputting an aligned, focused light beam.

2. The device of claim 1, wherein, the coated prism redirects the incoming beam exiting the fiber cable to be redirected perpendicular to the incoming path with minimum loss of power.

3. The device of claim 1, wherein a lens shapes the diverging light beam exiting a fiber and collimates it into a beam of parallel light, the lens including a focus lens and an assembly.

4. The device of claim 1 further including an anti-reflective coating applied to a surface to absorb any stray reflections.

* * * * *